March 7, 1933. M. KAHR 1,900,385
FUEL FEEDING MEANS
Original Filed March 5, 1926 4 Sheets-Sheet 4
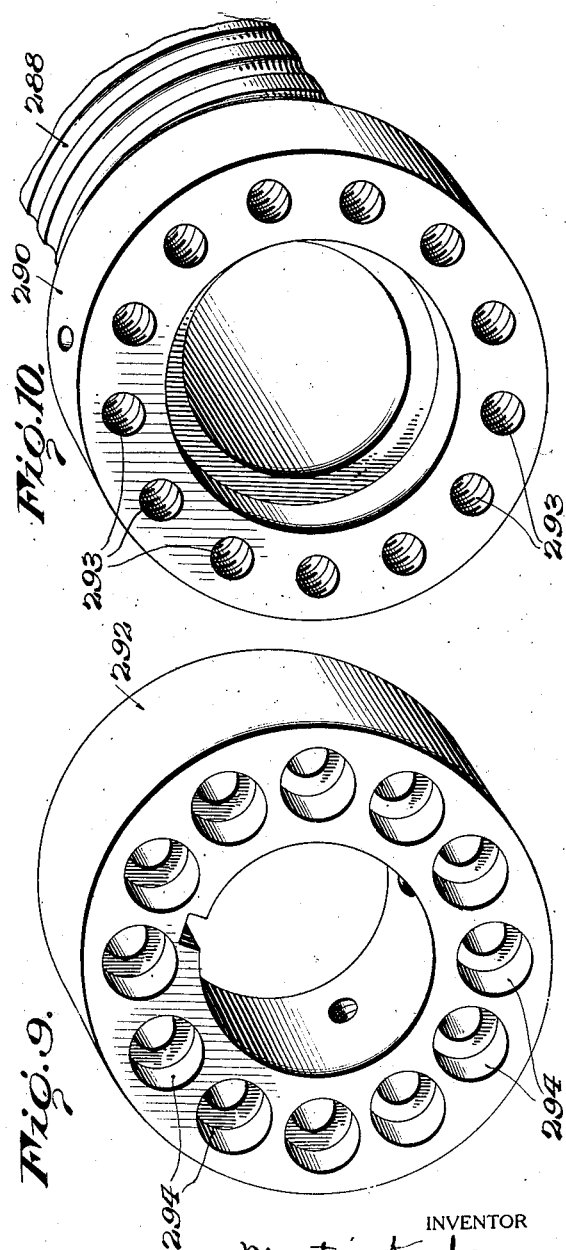

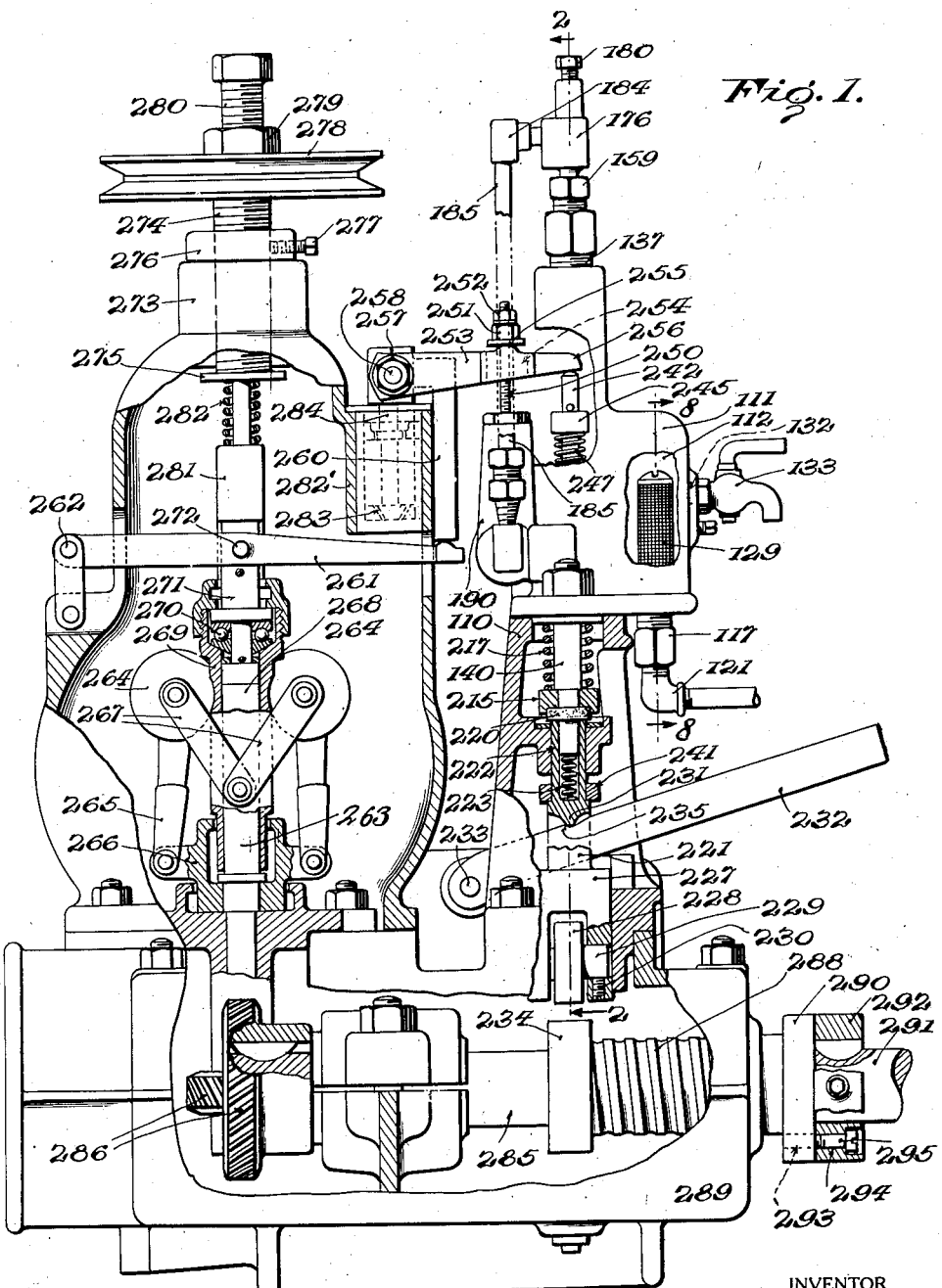

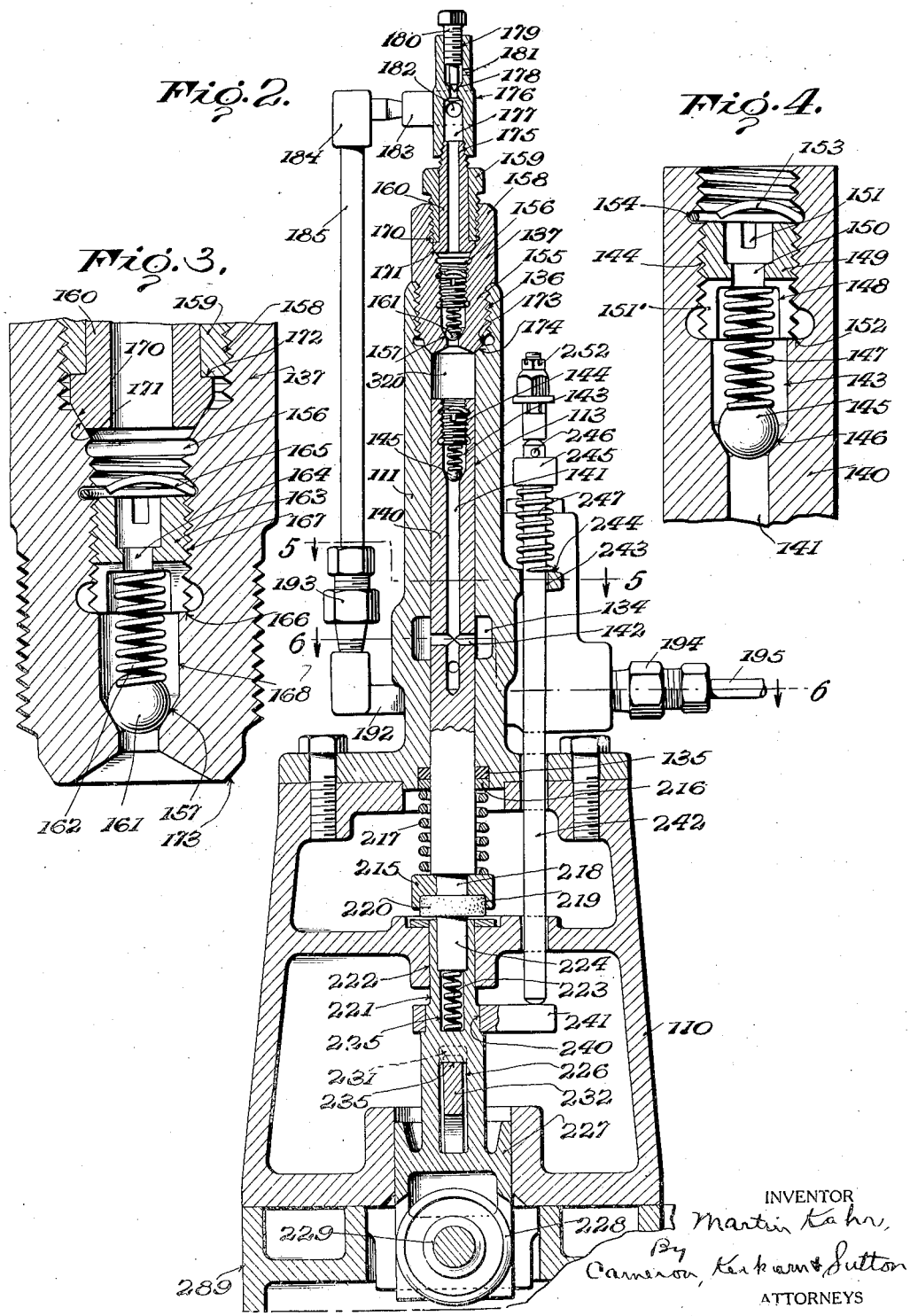

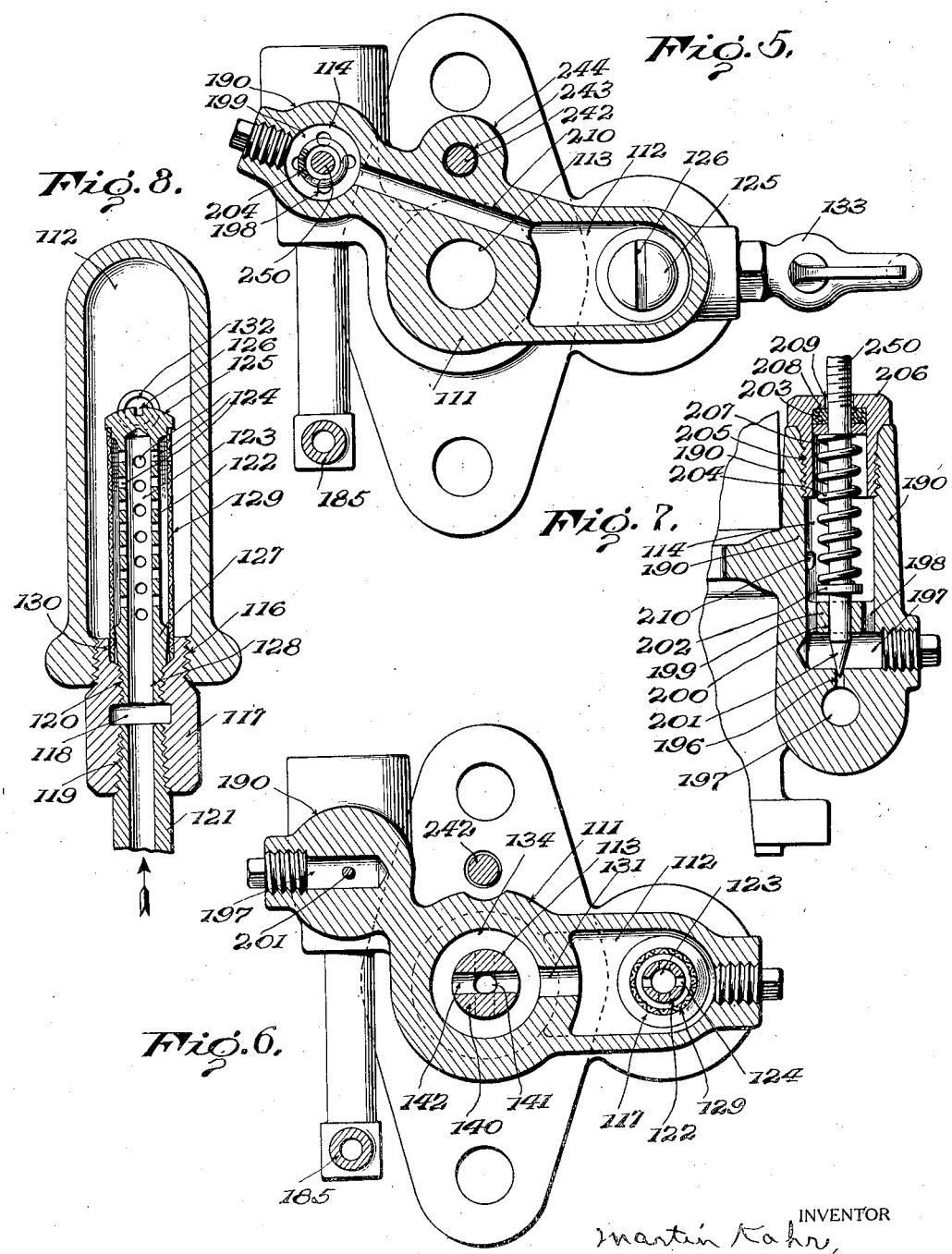

Patented Mar. 7, 1933

1,900,385

UNITED STATES PATENT OFFICE

MARTIN KAHR, OF FRANKLIN, PENNSYLVANIA, ASSIGNOR TO FRANKLIN VALVELESS ENGINE COMPANY, OF FRANKLIN, PENNSYLVANIA, A CORPORATION OF PENNSYLVANIA

FUEL FEEDING MEANS

Original application filed March 5, 1926, Serial No. 92,573. Divided and this application filed May 19, 1927. Serial No. 192,674.

This invention relates to internal combustion engines, and while certain features of the invention are susceptible of embodiment in other types of engines, it has particular reference to oil engines, especially engines of the Diesel or semi-Diesel type. Again, while an oil engine embodying the present invention is capable of a wide variety of uses, reference will be made, in order to illustrate certain novel features and advantages of the invention, to the particular utility of an engine of this type in oil field service, but it is to be expressly understood that the invention is not restricted to an engine so employed. This application is a division of my application Serial Number 92,573, filed March 5, 1926, for internal combustion engines.

One of the major objections heretofore raised to Diesel and semi-Diesel engines, and one that has militated against the more widespread use of engines of this type, is their inflexibility in service. For many services to which internal combustion engines are put it is highly desirable, if not essential, that the engine be capable of operating under a wide variety of loads and of running at a wide variety of speeds. For example, in oil field work an engine employed for drilling a well must be capable of elevating the drill under what constitutes a full load condition and then, when the drill has been raised to the top of its stroke, the engine must speed up sufficiently so as not to interfere with the down stroke of the drill, sometimes running under what amounts to a no-load condition. As the drill rebounds, the engine must be running at such speed as to pick up the drill promptly on its rebound, and carry it to the top of its stroke, with the consequent increase in load but without undue diminution of speed. These continually changing conditions of load and speed require an engine which is possessed of considerable flexibility. Oil engines as heretofore constructed have not possessed the requisite flexibility for services of this character, and it has been considered necessary to design each engine operating on a Diesel or semi-Diesel cycle to some particular condition of load and speed. It is an object of this invention to provide an oil engine which is highly flexible so that it may run efficiently and economically under a wide variety of conditions of load and speed.

Another object of the present invention is to provide fuel pumping and regulating mechanism which avoids the use of complicated and expensive injection systems heretofore in use, and which at the same time is promptly responsive, to the desired degree of sensitiveness, to the varying conditions of operation of the engine, and which delivers at the proper time and under the proper pressure accurately regulated quantities of liquid fuel by use of a construction which is relatively simple and inexpensive and yet rugged and effective in operation.

Other objects of the invention relate to the provision of improved means for adjusting the timing of the fuel injection; improved means for throwing the fuel pump into and out of operation; improved means for preventing undesirable vibrations as a result of the cooperation of the governor mechanism with the fuel pumping and regulating devices; improved means for regulating the quantity of liquid fuel discharged into the engine cylinder; and improved means for pumping liquid fuel. Other objects will appear as the description of the invention proceeds.

The invention is capable of receiving a variety of mechanical expressions, one of which has been shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures:

Fig. 1 is an elevation partially in axial section of a fuel pump and regulating and governing mechanism embodying the present invention.

Fig. 2 is an axial section through the fuel pumping and regulating mechanism on the line 2—2 of Fig. 1;

Fig. 3 is an enlarged detailed section of the discharge valve of the fuel pump;

Fig. 4 is an enlarged detailed section of the inlet valve of the fuel pump;

Fig. 5 is an enlarged transverse section through the fuel pump on the line 5—5 of Fig. 2;

Fig. 6 is an enlarged transverse section through the fuel pump on the line 6—6 of Fig. 2;

Fig. 7 is an enlarged detailed section of the needle or by-pass valve;

Fig. 8 is an enlarged detailed section through the inlet chamber in the fuel pump taken on line 8—8 of Fig. 1; and Figs. 9 and 10 are perspective views of the cooperating collars which constitute means for adjusting the timing of the fuel injection.

As pointed out above, the invention includes improved fuel pumping and regulating mechanism which is assumed hereinafter to be employed in conjunction with a suitable oil engine of the Diesel or semi-Diesel type provided with suitable fuel injectors for injecting liquid fuel into the cylinders of the engine.

In conformity with the present invention means are employed for delivering liquid fuel to an injector device embodying a fuel pumping and regulating device which avoids the use of compressed air. One embodiment of the invention is illustrated in Figs. 1 to 10 inclusive. Mounted on a suitable base 110 projecting from the frame of the engine is a pump casing 111 which is provided interiorly thereof with an inlet chamber 112, a pump cylinder 113, and a needle or by-pass valve chamber 114. Chamber 112 is provided at its bottom with a threaded aperture 116 (Fig. 8) in which is received an inlet nipple 117 threaded at its inner end for engagement in said aperture. Said nipple 117 has a passage 118 extending therethrough which is threaded from its opposite ends as shown at 119 and 120. Threaded into the end 119 of said nipple is a supply pipe 121 which leads from any suitable tank or other source of liquid fuel. Threaded into the end 120 of said nipple 117 is a strainer support 122 provided with an axially extending passage 123 which communicates with the exterior of the support through perforations 124 distributed throughout substantially the entire cylindrical surface of said support. At its upper end said support is provided with an enlarged head 125, slotted at 126, and at its opposite end said support is provided with an enlargement 127 and a threaded end 128 for coaction with the threads 120. Supported on the strainer support 122 is a strainer 129 which is retained at its upper end by the shoulder afforded by enlarged head 125 of said support, and which is held at its lower end between enlargement 127 on said support and the wall 130 of an enlarged section of the passage 118. Said strainer may be mounted on the support 122, and the support then threaded into the nipple 117 by the engagement of a screw driver in the slot 126, the strainer being clamped between the enlargement 127 on the strainer support and the wall 130 of the nipple. Thereafter the combined nipple, strainer support and strainer can be threaded into the aperture 116, and connections made between said nipple and the supply line 121.

Intermediate its length inlet chamber 112 is provided with a port 131 which communicates with the cylinder 113 of the pump proper. Referring to Fig. 8, it will be observed that the chamber 112 extends a considerable distance above said port 131 so as to form a dead air space within said chamber. Said dead air space constitutes an elastic cushion which receives the shock of the inflowing column of fuel from the supply line 121. Said chamber 112 is also preferably provided with an aperture 132 in its exterior wall above the plane of the port 131, and into this aperture is secured a cock 133 of any suitable construction. When the engine is to be put into operation the cock 133 is opened so as to permit the liquid fuel to flow into the chamber 112 until it reaches the level of said aperture 132, the air that otherwise would be trapped in said chamber escaping through the cock during the filling operation. Thereafter the cock is closed and the space within the chamber 112 above the plane of the aperture 132 constitutes a dead air chamber the elasticity of the air within which acts as a cushion to absorb the shock of the inflowing fuel.

Chamber 113 which constitutes the cylinder of the pump (see Fig. 2) extends throughout the height of the casing and intermediate its length is enlarged to provide a chamber 134 with which communicates the port 131 heretofore described. At the lower end said chamber 113 is enlarged to receive a packing ring 135 and at its upper end said chamber is enlarged and threaded at 136 to receive the discharge valve nipple 137.

Slidably mounted in said cylindrical chamber 113 is the plunger 140 of the fuel pump. Said plunger is provided with an axially extending passage 141 which communicates at its lower end with one or more radial passages 142 designed to communicate with the chamber 134 in order that the incoming fuel may flow to the passage 141 through the radial passages 142. Passage 141 adjacent its upper end is enlarged as shown at 143 and then further enlarged and interiorly threaded as shown at 144. Mounted within the enlarged sections 143 and 144 is the inlet valve which, in the form shown (see Fig. 4), includes a ball 145 designed to seat against the conical surface 146 which connects the main portion of the passage 141 with the first enlargement 143, and a coil spring 147 which engages said ball 145 and tends to hold the same in contact with its seat 146, said spring at its opposite end reacting against the bottom of a recess 148 in a nut 149 threaded into the portion 144 of said plunger. The nut 149 has an aperture 150 extending therethrough, and is preferably provided with a slot 151' so that the fuel may reach said aperture 150 even though the ball 145 be raised so far as to cause the coils of the spring 147 to contact. Said nut may also have a slot 151 so that it may be threaded into position by the engagement of a screwdriver in said slot. When threaded into operative position the lower end of said nut engages the shoulder 152 between the first and second enlargements, 143 and 144 respectively, in the axial passage through the plunger, and in this position said nut may be locked by a spring-locking ring 153, the wall of the enlargement 144 being desirably formed with a circumferential groove 154 to receive said spring-locking member.

The nipple 137 of the discharge valve includes an exteriorly threaded portion 155 for reception within the threaded aperture 136 at the top of the pump casing, and above said threaded portion said nipple is preferably squared or otherwise suitably formed so that it may be mounted in operative position by the engagement of a wrench therewith. Said nipple is provided with an axially extending passage 156 which adjacent its lower end is reduced in diameter to provide a conical seat 157 for the discharge valve. At its upper end said passage 156 is enlarged and interiorly threaded as shown at 158 to receive the gland sleeve 159 of union or coupling member 160. The discharge valve may be of any suitable construction being shown as of the same construction as the inlet valve and including (see Fig. 3) the ball 161 which is held in engagement with the seat 157 by a coil spring 162 which reacts between said ball and the bottom of a recess in a nut 163 provided with an axial passage 164, said nut being locked in operative position by a spring ring 165 with the lower end of said nut 163 in contact with a shoulder 166 formed between the intermediate threaded portion 167 of the passage 156 and the lower adjacent section 168 of reduced diameter.

Said union or coupling member 160 is provided at its inner end with a coned surface 170 which engages a conical surface 171 between the intermediate threaded portion 167 and the upper threaded portion 158 of passage 156, and said coupling member 160 is held with said conical surfaces 170 and 171 in fluid-tight or valve-like contact by the gland nut 159 which engages a shoulder 172 on said coupling member. Similarly the nipple 137 is provided at its inner end with a conical surface 173 which makes a fluid-tight contact with a similar conical surface 174 between the enlarged interiorly threaded portion 136 and the main section of the pump chamber 113. Hence fluid-tight contacts are maintained between the surfaces of each of the members forming the outlet discharge connections from the pump chamber 113.

The upper end of coupling member 160 is provided with a threaded nipple 175 to which is connected the piping leading to the fuel injector heretofore described. While any suitable connections may be employd, the form shown includes a housing 176 for an air vent valve, said housing having a passage 177 for the normal flow of oil and an aperture 178, at the top of said passage, which communicates with a threaded aperture 179. In said threaded aperture 179 is a valve member 180 in the form of a cap screw shaped at its lower end to close said aperture 178. A second aperture 181 leads from the threaded aperture 179 to the exterior of the housing 176, so that if valve 180 is backed off to open the apertures 178 and 181 any air which has accumulated in the passage 177, which is the highest point in the line from the fuel pump to the injector device, may escape through said apertures. When the line is full of oil, valve 180 is returned to its seat to prevent the escape of fuel through the aperture 178. Passage 177 communicates through aperture 182 with an angle union 183 which again connects through angle union 184 with the pipe 185 in the discharge line.

In the preferred embodiment of this invention a by-pass valve is provided in the discharge conduit to regulate the amount of liquid fuel which is delivered to the injector by the fuel pump heretofore described. In the form shown, the casing 111 is provided with a by-pass valve chamber 114 as heretofore referred to, said chamber being formed in a lateral projection 190 of the casing 111 as shown in Fig. 5. Adjacent the bottom of said casing projection 190 there is provided a transverse passage 191 which at one end communicates with pipe 185 through pipe 192 and a union 193 of any suitable construction. At its opposite end said passage communicates through union 194 with pipe 195 leading to the inlet passage of the injector. By preference one or more check valves, preferably two, are interposed in this line.

Said passage 191 communicates through a needle opening 196 with a chamber 197 which in turn communicates with the chamber 114 of the needle valve through apertures 198 in a transverse wall 199 which separates said chamber 197 from the chamber 114. Mounted within a central aperture 200 in said partition 199 is a needle valve 201 which carries a collar 202 between which and a second collar 203 loosely mounted on the stem of said needle valve is interposed a coil spring 204. The upper end of chamber 114 is interiorly threaded at 205 and received within said threaded portion is a coupling nut 206 which is recessed throughout the major portion of its length as shown at 207 to receive the upper end of the coil spring 204, the loose collar 203 and a packing ring 208 which is interposed between said ring 203 and the bottom of said recess 207. The stem of the needle valve extends through an aperture 209 in the head of the coupling nut and is threaded at its upper end for a purpose to be hereinafter described. The packing 208 is held in sealing contact with the bottom of the recess 207 and around the stem of the needle valve by the reaction of the spring 204 on the loose washer 203 so that escape of fuel through the aperture 209 is prevented. Spring 204 also by its coaction with the collar 202 on the needle valve tends to hold the needle valve closed except when the same is opened in the manner hereinafter described. When open the liquid fuel flowing through the transverse passage 191 from the discharge pipe 185 may flow upwardly through the needle opening 196 into the chamber 114. From chamber 114 the liquid fuel is returned to the inlet connections in any suitable way. In the form shown the casing 111 is provided with a cored passage 210 (see Fig. 5) which leads from the chamber 114 to the inlet chamber 112, so that any gas formed from the liquid fuel will accumulate in the dead air spaces in said chamber 112.

Pump plunger 140 may be operated in any suitable way. In the form shown, said plunger extends below the pump casing 111 where it is provided with a collar 215 between which collar and a loose ring 216 mounted on said plunger is interposed a coil spring 217. Coil spring 217 by its reaction on ring 216 holds the packing 135 heretofore referred to in sealing contact with the peripheral surface of the plunger so as to prevent leakage of the oil downwardly around the plunger from the chamber 134.

It will be noted that the liquid fuel in the chamber 134 is at substantially the pressure in the feed line 121; hence there is no high pressure on the fuel in chamber 134 tending to cause it to leak downwardly around the plunger, and any tendency to leak that may exist is prevented by the packing 135. Any leakage of fuel downwardly around the upper end of the plunger is returned to the chamber 134 which is at the lower pressure, while leakage around the discharge valve nipple or the coupling member 160 leading to the discharge conduit is prevented by the valve-like contact between the cone surfaces heretofore described. Hence leakage of fuel from the pump is effectively but simply prevented.

Collar 215 may be formed integrally with the lower end of plunger 140 or it may be separately formed and secured thereon in any suitable way as by shrinking the same onto the reduced lower end 218 of said plunger. Said collar on its under face is recessed as shown at 219 to receive and retain a disk 220 of fiber or any other suitable material for receiving the impact of the plunger operating device.

Said plunger operating devices may be of any suitable construction. In the form shown a plunger lifter 221 is mounted for reciprocating movement within an aperture 222 provided in a transverse wall or web of the bracket 110. Said lifter at its upper end is recessed as shown at 225 to receive a contact pin or plunger 224 which is normally pressed upwardly into contact with disk 220 by coil spring 223 reacting between said plunger pin and the bottom of said recess 225. Lifter 221 is slotted intermediate its length as shown at 226 and bifurcated at its lower end shown at 227 (Fig. 1). In the furcations of said bifurcated portion 227 is mounted a roller 228 on a roller pin 229 retained in apertures in said furcations in any suitable way, as by set screws 230.

The upper end wall of slot 226 is provided with a downwardly extending conical projection 231 and extending through said slot 226 is a lever 232 suitably pivoted on the frame or bracket, as at 233, said lever being designed to lift the roller 228 from operative contact with its cam 234. Said lever is preferably provided in its upper surface with a notch 235 in position to coact with the downwardly extending conical projection 231, the angularity of a wall of said notch being so selected with respect to the angularity of the surface of the conical projection 231 that when said notch is engaged with said conical projection, in the position of the lever wherein the roller 228 is held off of its cam 234, the parts are locked in that position owing to the friction between the wall of the notch 235 and the surface of the conical projection 231. The lever may be readily lowered to return the roller 228 to the surface of its cam 234 by exerting sufficient pressure on said lever to overcome the friction between the wall of the notch 235 and the conical projection 231.

Lifter 221 is reduced in diameter intermediate its length as shown at 240 and mounted on said portion 240 in any suitable way, as by shrinking the same thereon, is a laterally projecting arm 241 for operating the mechanism to control the needle valve. Said mechanism includes an upwardly extending lifter rod 242 which at its lower end projects into a position where it may be engaged by the lifter arm 241. Said rod extends upwardly through a guide aperture 243 in a lug 244 on the pump casing, and at its upper end is provided with a collar 245 held thereon in any suitable way, as by transverse pin 246 positioned in an aperture in the rod 242. A coil spring 247 is interposed between said collar 245 and the lug 244 whereby said pin is normally pressed upwardly into engagement with a regulating lever next to be described.

As heretofore referred to, the upper end of the stem of needle valve 201 is threaded, as shown at 250, and threaded on the upper end of said stem is a nut 251 retained in adjusted position in any suitable way as by a lock nut 252. Also mounted on said stem 250 is a regulating lever 253 provided with a slot 254 through which said stem 250 extends, said stem being flattened on either side for reception in said slot. Said lever 253 on either side of said slot is provided on its upper face with a fulcrum surface 255 for engagement with the lower face of the nut 251. Said lever at its end 256 extends into a position where it is engaged by the upper end of the lifter rod 242 (see Fig. 1). At its opposite end 257, said lever is pivoted at 258 to a movable element the position of which is controlled by governor mechanism.

Lever 253 is therefore a floating lever which is actuated by lifter rod 242, engaging its end 256, each time the pump plunger is elevated, because each time the pump plunger is raised the contact arm 241 engages and lifts the rod 242, and the upper end of said rod is always held by the spring 247 in contact with the end 256 of said lever. The elevation of end 256 of lever 253 causes the needle valve stem to be lifted by the engagement of the fulcrum surface 255 with the nut 251 on said stem, lever 253 fulcruming about its pivot 258. The time at which said lever 253 is actuated to lift the needle valve, however, varies in conformity with the position of the fulcrum 258. If fulcrum 258 is relatively low, the end 256 of lever 253 is relatively high, the lever tilting around its fulcrum surface 255 by reason of the upward pressure of the spring 247 on rod 242 in engagement with said end 256 of the lever. Hence the lower end of rod 242 is elevated with respect to contact arm 241 and the latter will engage said pin 242 to lift the needle valve only adjacent the end of the upward stroke of the plunger. If fulcrum 258 is relatively high, on the other hand, the lever 253 is tilted about its fulcrum surface 255 so as to depress end 256 and thereby the lower end of the rod 242 is pressed downwardly into a position where it is engaged with the contact arm 241 at an earlier point in the stroke of the plunger, so that the needle valve is open at an earlier portion of said stroke. Hence the instant at which the needle valve is opened with respect to the length of the stroke of the plunger depends upon the position of the fulcrum 258.

Fulcrum 258 is adjusted by means of governor mechanism of any suitable construction. In the form shown said fulcrum takes the form of a short shaft or pin which is carried by an L-shaped arm 260 which projects downwardly into a position to be operated by a governor or control lever 261 suitably pivoted, as at 262, to the housing of the governor. Said governor may be of any suitable construction but preferably is of the type disclosed in Letters Patent No. 1,630,637, granted May 31, 1927, to Charles H. Sheasley and Edgar H. Crossen.

Briefly, said governor includes a driven shaft 263 which carries fly-balls 264 mounted on arms 265 pivoted to the governor sleeve 266 which rotates with the shaft 263. Said balls 264 are also connected by links 267 to the vertically movable rod 268 which rotates with a guide sleeve 269. A ball bearing 270 is interposed between the rotatable elements of the governor and a non-rotatable vertically movable thrust rod 271 to which the lever 261 is pinned by the pivotal connection 272. Threaded within the upper end of the governor housing 273 is an exteriorly threaded sleeve 274 which at its lower end is provided with a stop flange 275 and which, intermediate its length, carries a stop collar 276 which may be secured in adjusted position thereon by means of a set screw 277. The upper end of said sleeve 274 carries a pulley 278 retained thereon by a nut 279. Threaded into the sleeve 274 is an adjusting screw 280 between the inner end of which and a shoulder 281 on the thrust rod 271 is interposed a coil spring 282. For oil field service said spring 282 is made relatively stiff for the reasons explained in the application of Sheasley and Crossen heretofore referred to, although for other purposes a lighter and more sensitive spring may be employed if desired. Said coil spring 282 opposes the outward movement of the fly-balls 274 and may be placed under different degrees of tension by rotating the threaded sleeve 274 inwardly or outwardly with respect to the governor housing 273. The stop flange 275 and the stop collar 276 are provided for determining the limits of such movement for reasons explained in said application of Sheasley and Crossen, and the adjustment of said sleeve is effected by a cord extending around pulley 278 in the manner described in said application.

As the speed of the engine increases and the fly-balls 264 fly outwardly the thrust rod 271 is elevated to raise the control lever 261, and thereby raise the fulcrum pin 258 to effect the operation of the needle valve and the cutting off of the injection of fuel at an earlier period in the stroke of the pump plunger in the manner heretofore described. As the engine decreases in speed, the fly-balls move inwardly, the lever 261 is lowered, as is also the fulcrum pin 258, and the needle valve is operated at a later period during the stroke of the pump plunger as heretofore described. Therefore, the instant at which the needle valve is operated to cut off the injection of fuel is nicely and accurately regulated in conformity with the speed of the engine within the degree of sensitiveness determined by the coil spring 282.

In order to prevent undue oscillation of the fulcrum 258 under the influence of the actuation of the lever 253 by the lifter rod 242, means are preferably provided for dampening the movements of said fulcrum 258. If pivot pin 258 and the connection therefrom to the control lever 261 are sufficiently long so that the side thrust on these elements produces such friction as to retard relative movements, separate means for dampening the movements of the fulcrum 258 are unnecessary. But I preferably connect said fulcrum 258 with the piston of a dash pot. In the form shown, the governor housing is provided at 282' with a cylinder, and mounted within said cylinder is a piston 283 having suitably restricted apertures and an upstanding post 284 on which fulcrum pin 258 is mounted. When a dash pot is thus provided the fulcrum 258 will be moved through the L-shaped thrust piece 260 only as determined by the movements of the governor or control lever 261, and the action of the lifter rod 242 on the lever 253 will not cause said lever to oscillate around its fulcrum surface 255 owing to the resistance to such oscillation imposed by the action of the dash pot.

The governor mechanism heretofore described is driven from a lay-shaft 285 of any suitable construction and mounted in any suitable way. In the form shown helical gearing 286 is interposed between said lay-shaft and the governor spindle 263. Said lay-shaft 285 also carries the pump plunger operating cam 234 which cooperates with the roller 228 on plunger lifter 221, as heretofore described, said cam operating to time the actuation of the pump plunger, and therefore the injection of the fuel into the combustion chamber, at the proper instant in the stroke of the piston. In order to provide for adjustment in this timing of the actuation of the pump plunger, said cam 234 is mounted on a sleeve 288 which extends outside of the oil tight crank casing 289 where it is provided with a flange 290. Section 291 of the lay-shaft is also provided with a flange 292 secured thereon in any suitable way, and said flanges are designed to be locked together in different positions of circumferential adjustment to vary the time of actuation of the pump plunger with respect to the stroke of the piston. To this end, said flanges 290 and 292 are provided with circumferential apertures and, as shown in Figs. 9 and 10, the number of said apertures in the two flanges is unequal. Any desired number of apertures may be provided depending on the nicety or fineness with which it is desired to make the adjustment. In the form shown the flange 290 is provided with thirteen apertures 293 and the flange 292 is provided with twelve apertures 294. The flanges are locked together by a bolt 295 which passes through one of the apertures in flange 292 and is threaded into one of the apertures in flange 290. By withdrawing the bolt 295 flange 292 may be rotated so as to bring an adjacent pair of apertures 293, 294 into register and, in the particular case illustrated, this represents an adjustment of 1/156 of a circumference of a circle or an adjustment of approximately 2⅓ degrees. It will be noted that the bolt 295 positively locks the two flanges 290 and 292 together so that there is no opportunity for slippage between the parts, as frequently occurs where the adjustment of the cam is effected by parts which are retained in adjusted position by friction.

In operation the amount of fuel injected into the combustion chamber is accurately regulated by the fuel pump and regulating means heretofore described. At each revolution of the cam 234 the roller 228 is operated to elevate the lifter 221 which in turn engages the contact piece 220 on the plunger 140 to thrust the pump plunger 140 upward. During this stroke of the plunger liquid fuel in the chamber 320 (Fig. 2) between the plunger 140 and discharge valve nipple is forced under high pressure through the discharge line 185 to the inlet passage of the injector, whence it flows through the passages in said injector and out through the nozzle. The amount of fuel thus injected into the engine is controlled by the needle valve 201 which, at a predetermined point during the stroke of the pump plunger, is elevated by engagement of the contact arm 241 with the lifter rod 242 which transmits its pressure to the lever 253 to elevate the needle valve stem in the manner heretofore described. The instant of such actuation of the needle valve is determined by the position of the fulcrum 258 of said lever 253, which position in turn depends on the speed of the engine by reason of the control of said fulcrum from the governor mechanism heretofore described. The instant the needle valve 201 is opened further discharge of fuel through the injector device ceases because the needle valve is in the discharge line between the fuel pump and the injector, and the instant the needle valve is opened the fuel being forced under pressure from the chamber 320 returns to the inlet chamber 112 of the fuel pump through the needle valve chamber 114 and the by-pass 210.

As the cam 234 continues its rotation the lifter 221 is lowered by the action of spring 217 and contact arm 241 is lowered to permit the lifter rod 242 to be lowered by spring 204 as it closes needle valve 201. As the plunger 140 is lowered its inlet valve 145 is lifted from its seat 146 and liquid fuel is forced into the chamber 320 from the passage 141. At the same time a suction is exerted on the fuel in the inlet chamber 112 so that fresh fuel flows into the chamber 134 and through the passage 141. At the end of the down stroke of plunger 140 inertia aids the spring 147 in closing valve 145. During the up stroke or discharge stroke of the pump plunger said inlet valve 145 is held to its seat by the pressure in the chamber 320, while the discharge valve 161 is lifted from its seat by the pressure in said chamber 320. Owing to the small size and character of this chamber 320, the plunger 140 operates with high efficiency in discharging the fuel therefrom. During the up-stroke or discharge stroke of the plunger pressure on the fuel in the inlet chamber 112 maintains the chamber 134 and the passage 141 in the plunger full of fuel. When fuel flows into said chamber 112 from the tank or other source of fuel provided, the shock of the inflowing fuel is absorbed by the air cushion at the upper end of said chamber 112.

In starting the engine a blow torch or other suitable source of heat may be applied to a suitable hot spot such as a hot tube in the engine cylinder until the same is sufficiently heated to ignite the charge of fuel and air in the combustion chamber, and thereafter the engine continues to run upon the Diesel or semi-Diesel principle in the manner well understood in the art.

It will therefore be perceived that an oil engine, particularly an engine of the Diesel or semi-Diesel type, has been provided which is highly flexible in service and which is capable of running efficiently under a wide variety of loads and speeds. At the same time the engine is capable of ready control, and may respond promptly to the varying conditions of load and speed.

Again referring to the requirements of such an engine in oil field service, it is capable of operating with entire satisfaction and efficiency under the varying conditions of load and speed required by such service:—As the drill reaches the top of its stroke and begins to drop, the engine will speed up, but without running away because of the governor control, so that the drill may make its stroke without interference from the engine. During this period the regulating devices heretofore described are operated to cut down the quantity of fuel supplied to the engine, but the diminution in the fuel discharged into the engine cylinder is not in proportion to the drop in load so that the engine speeds up. When the drill reaches the bottom of its stroke and rebounds, the engine is running at the proper speed for promptly picking up the drill on its rebound, and although the picking up of the drill is an assumption of full load conditions, the regulating devices heretofore described are effective to increase the quantity of fuel discharged into the engine cylinder to maintain a proper speed for carrying the drill to the top of its stroke. Similarly for other services the engine possesses the requisite flexibility which is attendant upon the capacity to operate with efficiency under a wide variety of loads and at a wide variety of speeds.

It will also be perceived that fuel pumping and regulating mechanism have been provided which avoid the use of injection systems heretofore in use which are complicated and bulky in structure and expensive to install and maintain. At the same time the fuel pumping and regulating mechanism is promptly responsive, with the desired degree of sensitiveness, to meet the varying conditions of operation of the engine, so that properly regulated quantities of fuel are discharged into the engine cylinder at the proper time, while undue increases or decreases of speed are prevented by the controlling and governing devices heretofore described.

There have also been provided improved devices for adjusting the timing of the fuel injection, for throwing the fuel pump into and out of operation, for preventing undesirable vibrations in the fuel regulating mechanism, and for regulating the quantity of fuel delivered to the engine, as well as improved means for pumping liquid fuel and for injecting liquid fuel and for effecting proper combustion of the fuel.

While the embodiment of the invention illustrated on the drawings has been described with considerable particularity, it is to be expressly understood that the invention is not to be restricted to the embodiment shown and described, as various other embodiments will now suggest themselves to those skilled in the art. Various changes may be made in the details of construction, arrangement and proportion of parts, and certain features may be used without other features. While the invention has been particularly described in conjunction with engines operating on the Diesel or semi-Diesel cycle, certain features of the invention are applicable to oil engines of other types, and certain features of the invention are applicable to internal combustion engines which employ a spark plug or magneto for initiating combustion, or which utilize a gaseous or vaporized fuel in place of atomized fuel, or which operate on other cycles than heretofore referred to. Reference is therefore to be had to the claims hereto appended for a definition of the limits of the invention.

What is claimed is:

1. In an internal combustion engine including an engine cylinder and an injection device for injecting liquid fuel thereinto, a pump including a plunger for forcing fuel through said injection device, a by-pass for the fuel, a valve controlling said by-pass and adapted to be moved to open position only during the fuel forcing stroke of said plunger, and means for operating said by-pass valve including a lever cooperating with the stem of said by-pass valve, means for continuously maintaining said lever in pivotal contact with said stem, a fulcrum device for said lever, means responsive to the speed of the engine for variously positioning said fulcrum device, and means positively movable by the plunger of said pump during its forcing stroke only for moving said lever about said fulcrum and thereby actuating the valve stem through the pivotal contact therewith of said lever.

2. In an internal combustion engine including an engine cylinder and an injection device for injecting liquid fuel thereinto, a pump including a plunger for forcing fuel through said injection device, a by-pass for the fuel, a valve controlling said by-pass and adapted to be moved to open position only during the fuel forcing stroke of said plunger, and means for operating said by-pass valve including a lever cooperating with the stem of said by-pass valve, means for continuously maintaining said lever in pivotal contact with said stem, a fulcrum device for said lever, means responsive to the speed of the engine for variously positioning said fulcrum device, means positively movable by the plunger of said pump during its forcing stroke only for moving said lever about said fulcrum and thereby actuating the valve stem through the pivotal contact therewith of said lever, and means for preventing movement of said fulcrum device due to the movement of said lever when operated by said last-named means.

3. In an internal combustion engine including an engine cylinder and an injection device for injecting liquid fuel thereinto, a pump including a plunger for forcing fuel through said injection device, a by-pass for the fuel, a valve controlling said by-pass and adapted to be moved to open position only during the fuel forcing stroke of said plunger, and means for operating said by-pass valve including a lever cooperating with the stem of said by-pass valve, means for continuously maintaining said lever in pivotal contact with said stem, a fulcrum device for said lever, means responsive to the speed of the engine for variously positioning said fulcrum device, means positively movable by the plunger of said pump during its forcing stroke only for moving said lever about said fulcrum and thereby actuating the valve stem through the pivotal contact therewith of said lever, and a dash-pot connected to said fulcrum device for preventing movement thereof when said lever is operated by said last-named means.

4. In an internal combustion engine including an engine cylinder and an injection device for injecting liquid fuel thereinto, a pump for supplying said injection device with fuel including a plunger, a by-pass for the fuel, a valve for said by-pass, a member pivotally contacting with the stem of said by-pass valve, means responsive to the speed of the engine for variously positioning said member about its pivot, and means for operating said member to open said by-pass valve including a rod yieldingly urged into abutting engagement with said member and a member movable with the plunger of said pump and mechanically disconnected from said rod for engaging and moving said rod during portions of the movement of said plunger.

5. In an internal combustion engine including an engine cylinder and an injection device for injecting liquid fuel thereinto, a pump for supplying said injection device with fuel including a plunger, a by-pass for the fuel, a valve for said by-pass, a member pivotally connected with said by-pass valve, means responsive to the speed of the engine for variously positioning said member about its pivot, and means for operating said member including a member movable with the plunger of said pump, a rod in the path of movement of said member, and a spring for holding said rod in engagement with said first-named member whereby said first-named member in its different positions of adjustment variously positions said rod for engagement at different times by said last-named member.

6. In an internal combustion engine including an engine cylinder and an injection device for injecting liquid fuel thereinto, a pump for supplying said injection device with fuel, said pump including a cylinder, a plunger in said cylinder, an inlet valve, said valve and the fuel conduit leading away therefrom being coaxial with said cylinder and plunger, a compression spring cooperating with said inlet valve, said spring being coaxial with and of larger diameter than said fuel conduit, a spring retaining member provided with a passage to permit the fuel to flow around the spring and into said conduit when the spring is compressed, and an outlet valve.

7. In an internal combustion engine including an engine cylinder and an injection device for injecting liquid fuel thereinto, a pump for supplying said injection device with fuel, said pump including a cylinder, a plunger in said cylinder, an inlet valve, an outlet valve, said outlet valve and the fuel conduit leading away therefrom being coaxial with said cylinder and plunger, a compression spring cooperating with said outlet valve, said spring being coaxial with and of larger diameter than said fuel conduit, and a spring retaining member provided with a passage to permit the fuel to flow around the spring and into said conduit when the spring is compressed.

8. In an internal combustion engine including an engine cylinder and an injection device for injecting liquid fuel thereinto, a pump including a plunger for forcing fuel through said injection device, a by-pass for the fuel, a spring-closed valve controlling said by-pass and adapted to be moved to open position only during the fuel forcing stroke of said plunger, and means for operating said by-pass valve including a lever cooperating with the stem of said by-pass valve, means for continuously maintaining said lever in pivotal contact with said stem, a fulcrum device for said lever, means responsive to the speed of the engine for variously positioning said fulcrum device, means positively movable by the plunger of said pump during its forcing stroke only for moving said lever about said fulcrum and thereby actuating the valve stem through the pivotal contact therewith of said lever, and a dash-pot connected to said fulcrum device, the resistive effect of said dash-pot being greater than that of the spring associated with said valve whereby movement of the fulcrum device is prevented when the lever is operated by said last-named means.

In testimony whereof I have signed this specification.

MARTIN KAHR.